(12) United States Patent
Del Prado Pavon et al.

(10) Patent No.: US 7,382,694 B2
(45) Date of Patent: Jun. 3, 2008

(54) METHODS TO RESOLVE TSF TIMER AMBIGUITY OF IEEE 802.11E SCHEDULE ELEMENT

(76) Inventors: Javier Del Prado Pavon, 111 S. Highland Ave., Apt. 7, Ossining, NY (US) 10562; Amjad Soomro, 54 Flower Rd., Hopewell Junction, NY (US) 12533; Sai Shankar Nandagopalan, 177 White Plains Rd., Apt. No. 74G, Tarrytown, NY (US) 10591; Stefan Mangold, 306 Eagle Bay Dr., Ossining, NY (US) 10562; Zhun Zhong, 24 Scenic Cir., Croton-On-Hudson, NY (US) 10520

( * ) Notice: Subject to any disclaimer, the term of this patent is extended or adjusted under 35 U.S.C. 154(b) by 303 days.

(21) Appl. No.: 10/572,925

(22) PCT Filed: Sep. 20, 2004

(86) PCT No.: PCT/IB2004/051801

§ 371 (c)(1),
(2), (4) Date: Mar. 22, 2006

(87) PCT Pub. No.: WO2005/029777

PCT Pub. Date: Mar. 31, 2005

(65) Prior Publication Data

US 2007/0121777 A1     May 31, 2007

Related U.S. Application Data

(60) Provisional application No. 60/504,838, filed on Sep. 22, 2003.

(51) Int. Cl.
*G04C 11/00* (2006.01)
*G04C 13/00* (2006.01)
*H04J 3/06* (2006.01)
*H04L 7/00* (2006.01)

(52) U.S. Cl. .................. 368/46; 370/350; 370/503; 375/354

(58) Field of Classification Search .................. 368/10, 368/46, 47, 52; 370/350, 503, 514; 375/354, 375/356, 357, 359
See application file for complete search history.

(56) References Cited

U.S. PATENT DOCUMENTS 5,517,505 A * 5/1996 Buchholz et al. ........... 370/350

(Continued)

OTHER PUBLICATIONS

Lai, T.H. "Efficient and scalable IEEE 802.11 Ad-Hoc Mode Timing SYnchronization Function", Proceedings of the 17th International Conference on Advanced Information Networking and Applications, Mar. 2003, pp. 318-323.*

(Continued)

*Primary Examiner*—Vit W Miska
(74) *Attorney, Agent, or Firm*—Peter Zawilski

(57) ABSTRACT

A plurality of methods, computer program product, and apparatus that use a lower 32 bit field of a 64-bit 802.11 TSF timer, so as to encode the reference time instant without the ambiguity as to whether there the reference time is referring to a future time or a past time. According to an aspect of the present invention, the fact that the low order 32 bits of the TSF timer wraps over in about 71 minutes is exploited to remove any ambiguity in the reference times contained in the Schedule Element frame. One method employs an algorithm base on distance between two reference points to determine whether the timer has wrapped around a time period, and another method uses a delay interval or a timeout to determine whether or not the TSF timer is wrapped or unwrapped. Another method includes determining whether an absolute value of X–O is less than, or greater than or equal to maximum value M/2.

22 Claims, 4 Drawing Sheets

U.S. PATENT DOCUMENTS

| | | | |
|---|---|---|---|
| 5,977,822 A * | 11/1999 | Rybicki et al. | 329/313 |
| 6,347,084 B1 * | 2/2002 | Hulyalkar et al. | 370/347 |
| 6,850,495 B1 * | 2/2005 | Baum et al. | 370/256 |
| 6,909,728 B1 * | 6/2005 | Kuribayashi et al. | 370/518 |
| 7,289,455 B2 * | 10/2007 | Jain et al. | 370/253 |
| 7,307,951 B2 * | 12/2007 | Dittmann et al. | 370/230 |
| 2002/0131398 A1 * | 9/2002 | Taylor | 370/350 |
| 2003/0093526 A1 * | 5/2003 | Nandagopalan et al. | 709/225 |
| 2003/0202482 A1 * | 10/2003 | Dittmann et al. | 370/252 |
| 2003/0206559 A1 * | 11/2003 | Trachewsky et al. | 370/509 |
| 2005/0018754 A1 * | 1/2005 | Song | 375/142 |

OTHER PUBLICATIONS

Tannenbaum et al, "Connection establishment", Computer Networks, 2002, pp 496-506.*

Benveniste, M. "Wireless LANS and Neighborhood Capture", Personal, Indoor and Mobile Radio Communications, 2002, vol. 5, Sep. 15, 2002,pp. 2148-2154.*

* cited by examiner

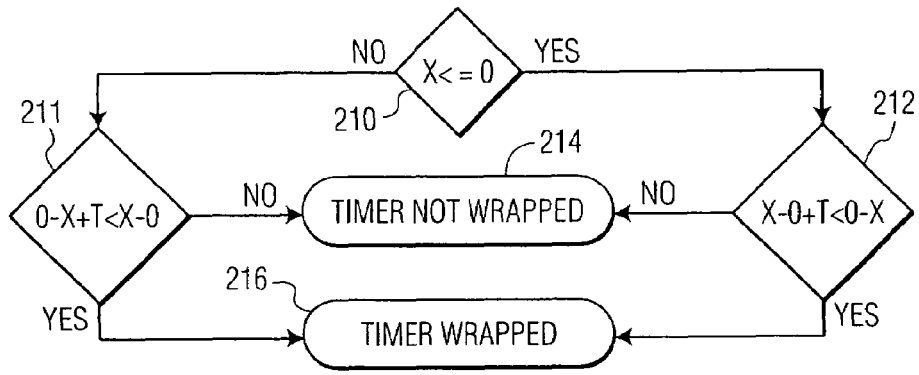
FIG. 2
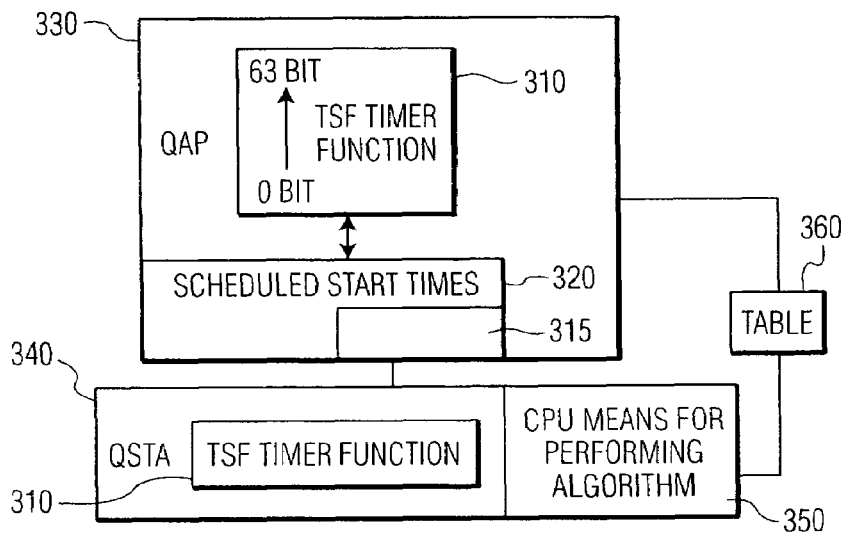
FIG. 3
1) TWO VARIABLES: T AND TIMEOUT
2) ASSUME T >> TIMEOUT. (IN OUR CASE T = 71 MINUTES, (E.G.) TIMEOUT = 5 MINUTES)
3) THE STATION RECEIVES X AT TIME 0
```
                    IF (0 < (0 - X) < TIMEOUT)
    CASE 2              X IS A BACKWARD REFERENCE
                    IF ((0 + T - X) < TIMEOUT)
    CASE 3              X IS A BACKWARD REFERENCE
                    ELSE
    CASE 1 AND 4        X IS A FORWARD REFERENCE
```
FIG. 4

| CASE NO | DID TIMER WRAP? | START LATER THAN RECVD. TIME? | ARITHMETIC | RESULT SIGN | MAGNITUDE OF DIFF |
|---|---|---|---|---|---|
| 1 | N | Y | X - 0 | + | < M/2 |
| 2 | N | N | X - 0 | − | < M/2 |
| 3 | Y | N | X - 0 | + | => M/2 |
| 4 | Y | Y | X - 0 | − | => M/2 |

FIG. 6

METHODS TO RESOLVE TSF TIMER AMBIGUITY OF IEEE 802.11E SCHEDULE ELEMENT

CROSS REFERENCE TO RELATED APPLICATION

This application claims the benefit of U.S. provisional application Ser. No. 60/504,838 filed Sep. 22, 2003 which is incorporated herein in whole by reference.

The present invention relates to IEEE 802.11e and the identification of the beginning of a service period. More particularly, the present invention relates to the use of a portion of the timing synchronization function to encode the reference time instant of a service period.

A method for wireless communication has been proposed for 802.11e. An infrastructure Basic Service Set (BSS) of IEEE 802.11 WLAN is composed of an Access Point (AP) and a number of stations associated with the AP. The AP connects the stations to the infrastructure.

In the latest draft of 802.11e TGe D4.0, a Schedule Element is included; this element identifies the service period from the start of the first successful CF-poll (contention-free poll) or downlink data transfer. However, due to the nature of wireless medium, there is an inherent ambiguity with respect to when the Schedule element started because the Quality of Service Station (QSTA) and the Quality of Service Access Point (QAP) may not view the instant that the Schedule Element started at the same point in time. This ambiguity can happen, for example, if a downlink frame was transmitted successfully and its Acknowledgement frame (ACK) were not received at the (QAP), the QSTA would mark the exchange as successful while the QAP would not.

There has been an attempt to overcome this problem by the use of the 64-bit Timing Synchronization Function (TSF), as evidenced by an IEEE document 11-03-107r1, Proposed Normative Text for Simplified APSD, by Mathilde Benveniste et al., Jan. 14, 2003. The 64-bit TSF timer value is available in IEEE 802.11 medium access control (MAC).

According to the IEEE document above, the scheduled start time indicates the time, expressed as units representing 32 TSF clock ticks, when a non-Access Point (AP) QSTA (Qos station) in Automatic Power-Save Delivery Mode (ASPD) shall first wake up to receive downlink frames buffered at the AP. The wakeup time period is considered the time interval, expressed as a TSF timer value, during which the non-AP QSTA requests the QAP to buffer the MAC Service Data Unit (MSDU) and the management frames before releasing the frames for delivery using a prioritized, or parameterized delivery mechanism. The station wakes up at a subsequent time when TSF-Start Time mod Wakeup-Time Period=0.

There are some problems when using the 64-bit TSF timer, for example, it is cumbersome to do the arithmetic and it requires more hardware complexity when this solution is implemented in hardware. Therefore, in order to reduce the complexity of the mechanism, it is proposed to use only the 32 low order bits of the TSF timer. However, another issue appears, that is, the fact that the low order 32 bits of the TSF timer repeat themselves, thus introducing an ambiguity as to whether or not a particular received reference time value refers to future time or the past time.

The present invention provides a plurality of methods that use a 32 bit field of the 802.11 TSF timer, rather than the entire 64 bits of the 802.11 TSF timer, so as to encode the reference time instant without the ambiguity as to whether there the reference time is referring to a future time or a past time. The present invention also includes a computer program that performs the functions described herein below if the invention is implemented in 802.11 software changes and basic hard modules if the invention is implemented in 802.11 hardware changes.

According to the present invention, the fact that the low order 32 bits of the TSF timer wraps over in about 71 minutes is exploited to remove any ambiguity.

According to a first aspect of the present invention, an algorithm utilizes the difference between a desired schedule start time X and the actual start time O, along with the time period T to determine whether or not the timer has wrapped.

According to a second aspect of the present invention, a delay interval or timeout is used to determine whether the desired start time X falls onto an interval smaller than the timeout from O.

According to a third aspect of the present invention, the magnitude of the difference between X and O is utilized to determine whether or not the timer has wrapped and to deduce whether there is a forward or back reference, meaning whether the reference time value refers to figure time or past time.

FIG. 2 is a flowchart of an algorithm that can be used to implement the first aspect of the presently claimed invention.

FIG. 3 is a block diagram identifying some of the hardware modules that can be used to implement the present invention.

FIG. 4 illustrates a second aspect of the claimed invention that resolves timer ambiguity showing a listing of four cases, two of which X is a backward reference and two of which X is a forward reference.

FIG. 6 is a table a listing four cases according to the third aspect of the invention, indicating whether the timer has wrapped and status of start time versus received time, with a magnitude of difference of M/2.

It is to be understood by persons of ordinary skill in the art that the following descriptions are provided for purposes of illustration and not for limitation. An artisan understands that there are many variations that lie within the spirit of the invention and the scope of the appended claims. Unnecessary detail of known functions and operations may be omitted from the description so as not to obscure the present invention.

Figure 1:
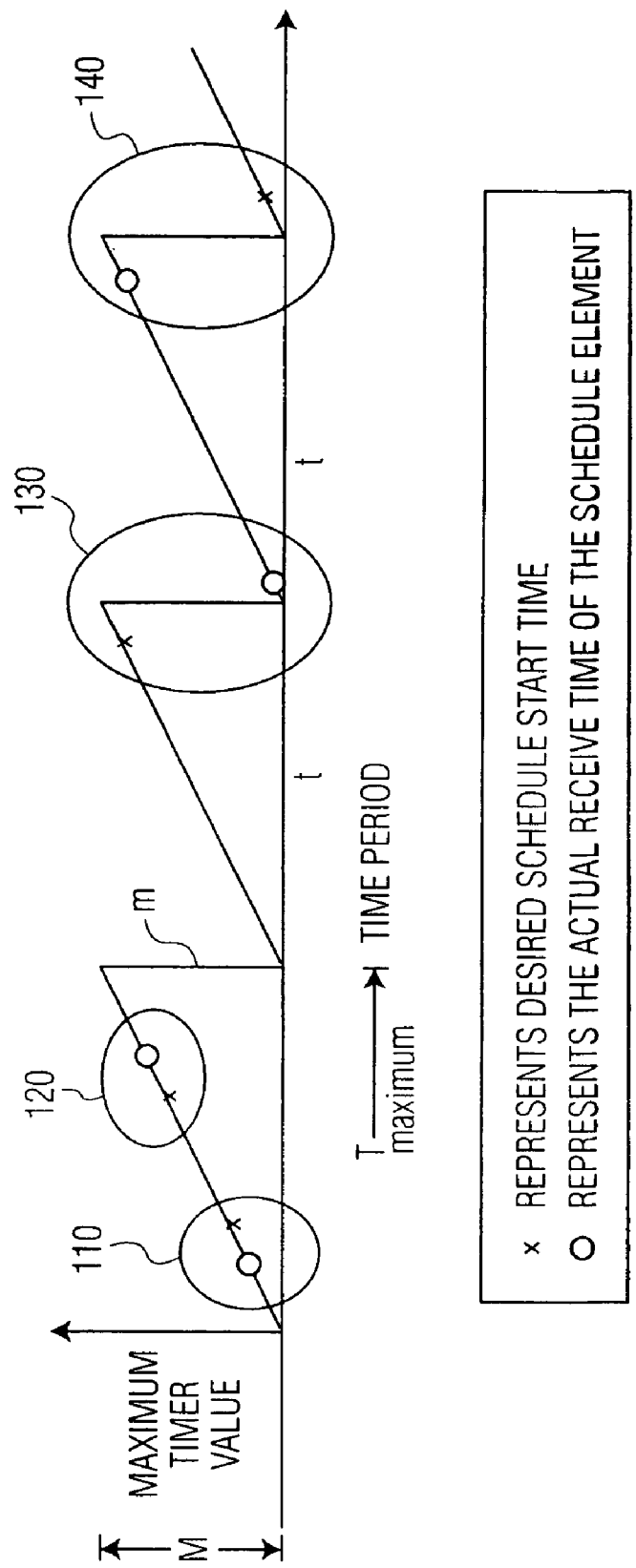
FIG. 1 is a diagram showing the TSF timer value M versus the time T for four possible cases according to a first aspect the present invention.

FIG. 1 illustrated a timing diagram according to the present invention. The Y-axis represents timer values in with a maximum of M of the 802.11 TSF timer and the X-axis represents time t with a cycle period of T. The period T is about 71 minutes, which correlates to about the time in which the low 32 bits of the 802.11 TSF timer wraps over. It should be noted that rather than split FIG. 1 into four separate drawings, four possibilities are shown on the same drawing. Although the "T" is referred to as the first T, and subsequent periods identified by the saw tooth are referred to as Time periods 2, 3 and 4, it should understood that the possibilities are depicted randomly, and there is no timing relationship between the different possibilities shown and described.

Reference numbers 110, 120, 130 and 140 refer to case 1, case 2, case 3 and case 4, respectively. Each case is a possibility of how the Scheduled Start Time and the Actual Receive Time of the Scheduled Element may occur. According to the legend, for each case "X" represents the desired Schedule Start Time, whereas "O" represents the actual receive time of the Schedule Element.

Thus, according to FIG. 1, case 1 (element 110) the actual receive time of the Schedule Element occurred before the desired Schedule Start Time. Also, it should be noted that both "O" and "X" occur within the same period "T" for both case 1 and case 2 (element 120).

With regard to case 2 (120), it is noted that this case is the opposite of case 1 in that the actual receive time of the Schedule Element is received after the desired Schedule Start time. However, similar to case 1, both the "O" and the "X" occur within the same time period.

With regard to case 3 (130), it is noted that this case is yet another variation of occurrences as the scheduled start time "X" occurs before the actual receive time of the Schedule Element However, unlike the previous cases, the "X" occurs during the second "T" interval, but the "O" occurs during the third "T" interval.

With regard to case 4 (130), it is noted that this case is the opposite situation from case 3 in that the actual receive time of the Schedule Element is received before the desired Schedule Start Time. Similar to case 3, the "X" and "O" occur in different time intervals, in this case with the actual receive time "O" of the Schedule Element occurring in a third time period T, but the desired Schedule Start time "X" occurring in a fourth time period T.

From a visual inspection of FIG. 1, it can be seen that in cases 1 and 2 (110 and 120) the timer is not wrapped but in cases 3 and 4 it is. An algorithm can mathematically verify the cases shown above, and such an algorithm can be used in a first aspect of the present invention.

Based on the above description of FIG. 1, one aspect of the present invention is to perform an algorithm based on the possibilities shown in the Figure. The steps are as follows:

(1) The "X" value can be from the same interval (Time period "T") or from a different interval.

(2) Use the "X" value that is closest to the "O" value.

(3) Perform step (2) by two subtractions of the "X" value and the "O" value and choose the one having the smallest result.

(4) Estimate if the X value is in the same cycle (Time period) or in a different cycle (Time period) of the "O" value.

FIG. 2 is a flowchart of an algorithm showing how the above steps would be performed. Using case 1 (110) and following the flowchart shown in FIG. 2, it will be presumed that O is equal to 10, X is equal to 15 and T is equal to 71, to illustrate the computational steps only. A person of ordinary skill understands that other values for O, X and T can be used, and these figures are for purposes of illustration and not limitation.

At step 210, it is determined whether X<O; as 15 is clearly not less than 10, the answer is no, we advance to step 211, where it is determined whether O−X+T<X−O. Thus is 10−15+71<15−10? As 66 is not less than 5, so the answer to step 211 is no. Following the NO leg, we come to step 214 where it has been determined that the timer is not wrapped.

Using case 2 (120) and following the flowchart in FIG. 2, it will be presumed that O is equal to 55 and X is equal to 45, while T remains at 71, again for purposes of illustrating illustrate the computational steps and in no way limits the claimed scope of the invention.

At step 210, it is determined whether X<O; as X is 45 and O is 55, the answer is yes, and we proceed to step 212. Step 212 determined whether X−O+T<O−X, so we insert the values and check whether 45−55+71<55−45, or is 61<10? The answer is no, so we proceed on the no leg of step 212 to step 214, where it has been determined that the timer is not wrapped.

Using case 3 (130) and following the flowchart in FIG. 2, it will be presumed that X is 65 and O is 5, while T remains at 71.

At step 210, it is determined whether X<O. As 65 is not less than 5, we proceed on the no leg of Step 210 to step 211. Here it is determined whether O−X+T<X−O. Thus it is determined whether 5−65+71<65−5, which doing the math is asking is 11<60? As 11 is less than 60, we follow the no leg of step 211 to step 216 and determine that the timer has been wrapped.

Using case 4 (140) and following the flowchart in FIG. 2, it will be presumed that O is 67 and X is 3, while T remains at 71.

At step 210, it is determined whether X<O. As 3 is less than 67, we follow the yes leg to step 212, where it is determined whether X−O+T<O−X, so we insert the values and check whether 3−67+71<67−3, or whether 7<64. As we know that 7 is less than 64, we follow the yes leg from step 212 to step 216 and determined that the timer has been wrapped.

It should be understood by persons of ordinary skill in the art that the above method may also be expressed as a computer program that executes the algorithm.

As shown in FIG. 3, the present invention may also comprise hardware. One aspect would be to have certain hardware modules performing the different functions, or multiple functions of the method steps. The TSF timer 310 is shown as a function module performed in both the QAP 330 and OSTA 340. The QAP has a storage area 320 containing scheduled start times. These start times could be contained within a storage portion of the TSF timer itself, or some other hardware module. The QSTA 340 receives the schedule element time from the QAP 330. A CPU 350 arranged in the QSTA 340 performs the algorithm or a variation thereof previously discussed above, and this element can be referred to as a means for performing the algorithm.

The CPU 350 will perform the algorithm and determine from data received from the QAP whether the timer has wrapped. This information will be used by the QSTA to resolve any possible ambiguity caused by 32 bit wrapped to indicate the time period is past or future time when determining received times versus scheduled times. This determination is made by QSTA internally. That is, it knows when it received the frame containing the Schedule Element at O, and it parses the reference time X from the Schedule Element and the CPU then runs the algorithm to resolve the ambiguity.

In addition, a table 360 may be created that stores the timer data, based on the X and O values so that for a given position of an X and O, the reference values can be retrieved from the table instead of being recalculated each time.

FIG. 4 illustrates a second aspect of the present invention, wherein the method steps can be based on a delay interval or timeout. As in the first aspect of the invention, X refers to the desired scheduled start time and O refers to the actual receive time of the scheduled element.

In this aspect of the invention, it is required to check if the desired time X falls onto an interval similar than the timeout from O. As shown in FIG. 4, an algorithm has two variables, T and timeout. It is assumed that: (1) T>>>timeout; and (2) the station receives X at time O. Also, if (0<(O−X)<timeout) the X is a backwards reference. On the other hand, if (O+T−X)<(timeout), X is still a backward reference. If none of the above is true, X is a forward reference.

FIG. 4 shows that in the case of 1 (110) and 4 (140) (the four cases being shown in the graph of FIG. 1), X is a forward reference, meaning that the desired scheduled start time was later in time than the actual received time O of the schedule element.

With regard to case 2 (120 in FIG. 1), wherein the actual received time of the scheduled element O occurred after the desired Schedule Start time X, then the X reference is deemed to be a backward reference as (0<(O−X)<Timeout).

With regard to case 3 (130 in FIG. 1) wherein the actual received time of the scheduled element O occurred after the desired Schedule Start time X, the X reference is deemed to be a backward reference. In fact, in this case the element O occurred in a different time period than element X.

Thus, the ambiguity is resolved in the second aspect of the invention, utilizing a time delay interval and/or timeout value.

Figure 5:
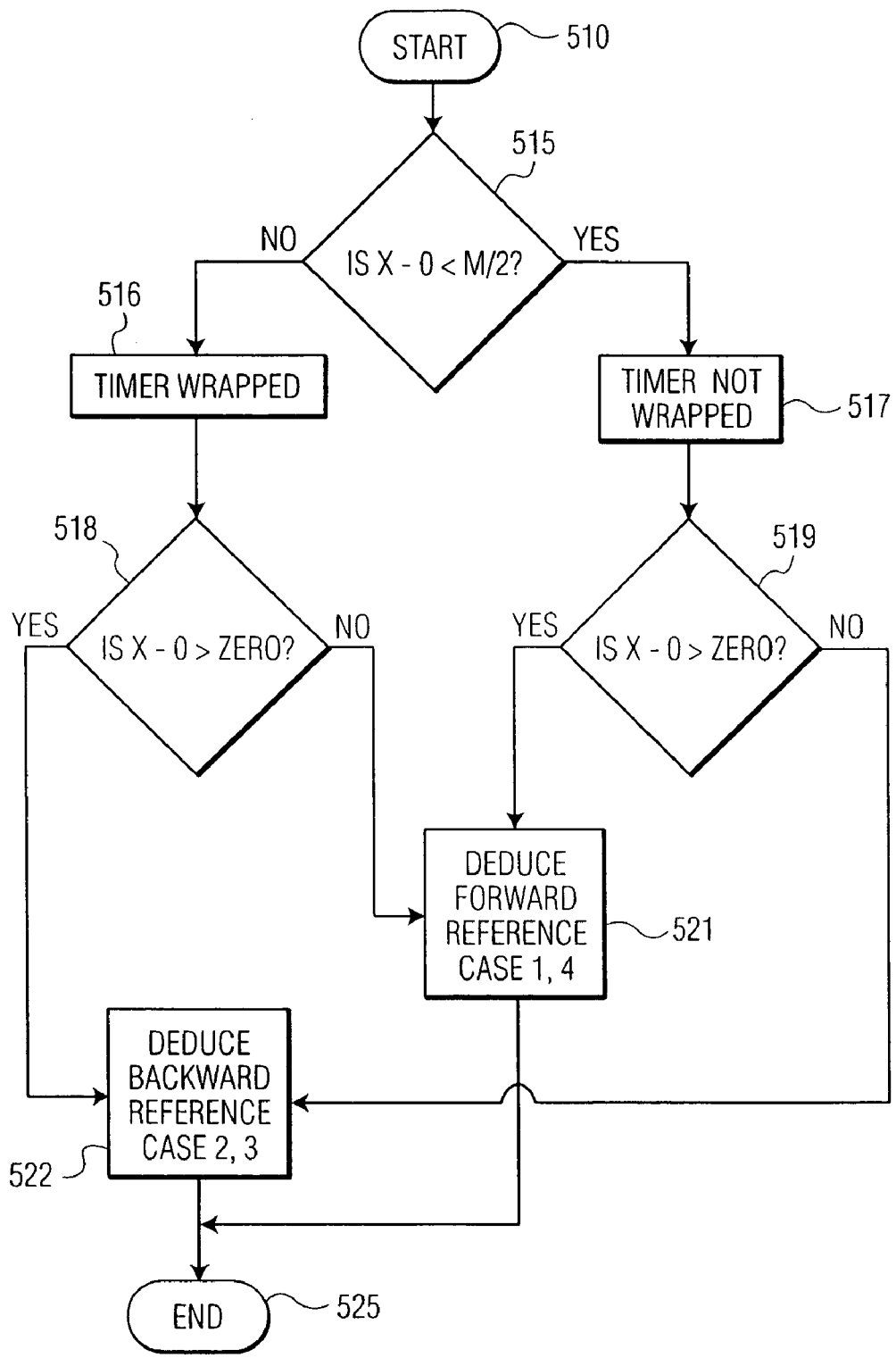
FIG. 5 is a flowchart showing a third aspect of the invention wherein the ambiguity is removed by a different algorithm than that shown in FIG. 2.

FIGS. 5 and 6 illustrate a third aspect of the present invention, which is a special case in which the timeout value, instead of the exemplary 5 minutes above, is equal to M/2, with M being the timer value. It is to be understood that the values of M that might be selected are not to scale with the positions of the "X" and "O's" shown in FIG. 1, although the graph's relative distance being greater than or less than is accurate.

According to this aspect of the present invention and as shown in FIG. 6, the magnitude of difference M follows the formula |X−O|>M/2. If the absolute value is greater than the value of M/2, it is to be assumed that the TSF time has wrapped.

Referring back to FIG. 5, a flowchart of an algorithm according to this third aspect of the present invention is shown. At step 515 it is determined whether |X−O|<M/2. If it is then we proceed to step 517, where it is determined that the timer is not wrapped. Next at step 519 it is determined whether X−0>Zero. If the answer to step 19 is yes, the method proceeds to step 521 where forward reference in cases 1 and 4 is deduced. However, if the answer at step 519 is no, the method proceeds to step 522, where a backward reference is deduced, as in case 2 and 3.

Reverting back to step 515, in the case where it is determined that |X−O|<M/2 is not true, the method alternately proceeds to step 516 where it is indicated that the timer has wrapped. At step 518, it is determined whether X−O>Zero. If the answer is yes at step 518, the method continues to step 522 where a backward reference is deduced as in cases 2 and 3. However, if the answer at step 518 is no, the method proceeds to step 521, where a forward reference is deduced as in cases 1 and 4, and then the method ends. Thus there will be no ambiguity in the reference time selected and recorded. It should be noted that when performing the algorithm according to the second aspect of the instant invention, in the case where timeout is M/2, the third aspect can be considered a subset of the second aspect for such a condition.

FIG. 6 shows cases 1 through 4 in table form, wherein it is asked whether the timer wrapped, whether the start time is later than the received time, the arithmetic, the result sign, and the magnitude of the difference. In cases 1 and 2, wherein it is not assumed that the timer wrapped, case 1 shows the start time later than the received time, and a resulting plus sign. On the other hand, case 2 shows the received time was later than the schedule start time, and the resulting sign is minus. In the cases 3 and 4, where the absolute value of X−O is greater than or equal to M/2, it is assumed that the timer wrapped, and when the scheduled start time is not later than the received time, the result sign is a plus, whereas it is a minus in case 4, wherein the start time was later than the received time. Thus the assumption that the absolute value of X−O is greater than M/2 removes the ambiguity regarding the possibility of the timer wrap giving an inaccurate result.

The present invention can be expressed as a computer program on a computer readable medium, where for example, it can follow the flowchart shown in FIG. 5. One of the steps would be to report the finding as to whether to not the timer has been wrapped into the next time period when looking at the values of M to encode a reference time instant.

It should be understood that various modifications may be made to the present invention that do not depart from the spirit of the invention or the scope of the appended claims. For example, the types of methods may be changed according to need. For example, the notation of X and Y is used for illustrative purposes only. Using somewhat different notation, for example, Y and Z assignments, is within the spirit of the invention and the scope of the present claims. While the time T of about 71 minutes is used to describe the typical length of a time period, these can be longer or shorter, and the amount of variance does not have to take 71 minutes into acct, for example there could be a T of 22 minutes, or 10 minutes. Also, the four cases shown in FIG. 1 do not have to be in the order shown in FIG. 1, and/or in the tables as shown. The first case could be any of the four shown, and the same is true for cases two through four. Finally, while some of the appended claims refer to the use of the lower 32 bits, we note that it is within the spirit and scope of the invention that other sets of 32 bits could be used, such as the upper 32 bits, or the middle 32 bits (bits 16-48).

The invention claimed is:

1. A method of removing ambiguity from a timer subject to time wrapping, said method comprising the steps of:
    (a) activating a lower half of a total number of bits in said timer that repeat after a time period T;
    (b) assigning a desired schedule start time of the lower half total number of bits as a reference time X;
    (c) recording an actual received time of the lower half total number of bits as a reference time O; and
    (d) determining whether references X and O occur during the same time period T or fall into a different time period (T2).

2. The method according to claim 1, wherein the timer comprises an IEEE 802.11 TSF timer.

3. The method according to claim 1, wherein step (d) further comprises identifying the references as a referring to a past time or a future time.

4. The method according to claim 3, wherein the reference values and the determination in step (d) are stored in a table.

5. The method according to claim 2, wherein the determination in step (d) further comprises determining whether the values of references X and O correspond to one of four possible cases, wherein a first case includes no timer wrap into a different time period and the scheduled start time X later than the actual received time O.

6. The method according to claim 2, wherein the determination in step (d) further comprises determining whether the values of references X and O correspond to one of four possible cases, wherein a first case comprises an indication of no timer wrap into a different time period and the scheduled start time X coming before than the actual received time O.

7. The method according to claim 2, wherein the determination in step (d) further comprises determining whether the values of references X and O correspond to one of four possible cases, wherein a first case comprises an indication of a timer wrap into a different time period and the scheduled start time X coming before the actual received time O.

8. The method according to claim 2, wherein the determination in step (d) further comprises determining whether the values of references X and O correspond to one of four possible cases, wherein a first case comprises an indication of a timer wrap into a different time period and a scheduled start time X coming later than the actual received time O.

9. The method according to claim 1, wherein the period T of the timer in step (a) is of a predetermined fixed duration.

10. The method for determining whether or not a lower 32 bits of a Timing Synchronization Function (TSF) have wrapped into a different time period, said method comprising the steps of:
   (a) assigning a desired scheduled lower 32 bit start time as a reference time X that is timed by a TSF timer;
   (b) recording an actual received time of the lower 32 bit start time of the TSF timer as a reference time O;
   (c) determining whether X<O and performing sub-step (i) if affirmative and sub-step (ii) if negative:
      (i) using a known time period T of a TSF timer determining whether (O−X+T)<(X−O) when X is not greater than O; and
      (i)(a) identifying the TSF timer as not being wrapped if (O−X+T) is not less than (X−O); or
      (i)(b) identifying the TSF timer as being wrapped if (O−X+T) is less or equal than (X−O);
      (ii) using a known time period T of a TSF timer determining whether (X−O+T)<(O−X) when X is greater than O; and
      (ii)(a) identifying the TSF timer as not being wrapped if (X−O+T) is not less than (O−X); or
      (ii)(b) identifying the TSF timer as being wrapped if (X−O+T) is less or equal than (O−X).

11. The method according to claim 10, wherein the TSF comprises an 802.11e timer.

12. The method according to claim 10, wherein the period T of the timer in step (a) is of a predetermined fixed duration.

13. The method according to claim 12, wherein the time period T in step (c) is about 71 minutes.

14. A method for determining whether or not a timer has wrapped into another time period, said method comprising the steps of:
   (a) assigning a desired schedule start time as a reference time X that is timed by a timer having a period of T and using only a lower 32 bits;
   (b) recording an actual received start time of the timer as a reference time O;
   (c) check if the desired scheduled start time X falls within an interval not greater than a timeout from O, where T <<timeout; and a station receives a schedule element containing a field having a start time represented by X at time O;
   (d) if (0<(O−X)<timeout) then X is a backwards reference; if (O+T−X)<(timeout) and then X is a backward reference; otherwise if the equations are inapplicable then X is a forward reference.

15. The method according to claim 14, wherein the timer comprises a Timing Synchronization Function (TSF).

16. The method according to claim 15, wherein the TSF timer comprises a 64 bit 802.11 TSF timer and the values X and O use a lower 32 bits out of a 64 bit total.

17. A method for determining whether or not a timer has wrapped into a different time period, said method comprising the steps of:
   (a) assigning a desired schedule start time as a reference time X that is timed by a timer using only a lower 32 bits of a 64 bit total;
   (b) recording an actual received time of the timer as a reference time O;
   (c) determining if $|X-O|>M/2$, with M being a maximum TSF timer value, wherein if $|X-O|$ is less than $M/2$, the TSF timer is identified as not being wrapped, and wherein if $|X-O|$ is greater or equal than $M/2$, the timer is identified as being wrapped;
   (d) determining whether X−O>Zero for both a wrapped condition and unwrapped condition;
   (e) (i) if X−O>Zero for the Timer wrapped condition, deduce a backward reference case;
   (e)(ii) if X−O is less or equal to for the Timer wrapped condition, deduce a forward reference case;
   (f)(i) if X−O>Zero for the Timer unwrapped condition, deduces a forward reference; and
   (f)(ii) if X−O is less or equal to Zero for the Timer unwrapped condition, deduce a forward reference case.

18. A computer program on a computer readable medium containing the method according to claim 1.

19. A computer program on a computer readable medium containing the method according to claim 10.

20. A computer program on a computer readable medium containing the method according to claim 14.

21. A computer program on a computer readable medium containing the method according to claim 17.

22. An apparatus for removing ambiguity from an IEEE 802.11e schedule element reference times, said apparatus comprising:
   a 64-bit Timing Synchronization Function (TSF) that provides a timing function utilizing 32 of the 64 bits to provide a time period T;
   a schedule element stored in a storage area that can be accessed by a Quality of Service Station (QSTA);
   a Quality Access Point (QAP) and the (QSTA) both receive a schedule element frame 315 containing scheduled start times; and
   a CPU having an algorithm module for determining whether the time period T has fallen into a past time or a future time period, depending on whether two or more predetermined reference elements are both within a same time period T, or fall in previous (past) or subsequent (future) time periods relative to time period T.

* * * * *